United States Patent
Fechner et al.

(10) Patent No.: US 10,955,854 B2
(45) Date of Patent: Mar. 23, 2021

(54) METHOD AND SYSTEM FOR DETERMINING THE POSITION OF A VEHICLE

(71) Applicant: Conti Temic microelectronic GmbH, Nuremberg (DE)

(72) Inventors: Thomas Fechner, Wasserburg (DE); Stefan Heinrich, Achern (DE); Stefan Hegemann, Wangen (DE); Ralph Grewe, Frankfurt am Main (DE)

(73) Assignee: CONTI TEMIC MICROELECTRONIC GMBH, Nürnberg (DE)

( * ) Notice: Subject to any disclaimer, the term of this patent is extended or adjusted under 35 U.S.C. 154(b) by 703 days.

(21) Appl. No.: 15/369,349

(22) Filed: Dec. 5, 2016

(65) Prior Publication Data
US 2017/0176998 A1 Jun. 22, 2017

Related U.S. Application Data

(63) Continuation of application No. PCT/DE2015/200300, filed on Jun. 5, 2015.

(30) Foreign Application Priority Data

Jun. 5, 2014 (DE) ...................... 10 2014 210 770.9

(51) Int. Cl.
*G01C 1/00* (2006.01)
*G05D 1/02* (2020.01)
(Continued)

(52) U.S. Cl.
CPC ............ *G05D 1/0246* (2013.01); *B60R 11/04* (2013.01); *G01C 21/30* (2013.01);
(Continued)

(58) Field of Classification Search
CPC .... G05D 1/0246; G05D 1/0278; G01C 21/30; G01C 21/3602; G01S 5/16
See application file for complete search history.

(56) References Cited

U.S. PATENT DOCUMENTS

2007/0005306 A1 1/2007 Foessel
2008/0009966 A1 1/2008 Bruemmer et al.
(Continued)

FOREIGN PATENT DOCUMENTS

DE 69712906 T2 4/2003
DE 102007003014 A1 7/2008
(Continued)

OTHER PUBLICATIONS

International Search Report and Written Opinion dated Sep. 21, 2015 from corresponding International Patent Application No. PCT/DE2015/200300.
(Continued)

*Primary Examiner* — Adam M Alharbi

(57) ABSTRACT

A method and a device for determining the position of a vehicle, said method comprising the steps: recording sensor data from the ground over which the vehicle travels; extracting ground characteristics of the ground over which the vehicle travels from the recorded sensor data or from occupancy grids which are calculated on the basis of the sensor data; determining the current position of the vehicle on the basis of the extracted ground characteristics using a characteristic map.

20 Claims, 3 Drawing Sheets

(51) Int. Cl.
| | |
|---|---|
| *G01C 21/30* | (2006.01) |
| *G01S 5/16* | (2006.01) |
| *G01C 21/36* | (2006.01) |
| *B60R 11/04* | (2006.01) |
| G01S 13/42 | (2006.01) |
| G01S 17/42 | (2006.01) |
| G06K 9/00 | (2006.01) |

(52) U.S. Cl.
CPC ............ *G01C 21/3602* (2013.01); *G01S 5/16* (2013.01); *G05D 1/0278* (2013.01); *G01S 13/42* (2013.01); *G01S 17/42* (2013.01); *G06K 9/00791* (2013.01)

(56) References Cited

U.S. PATENT DOCUMENTS

| | | |
|---|---|---|
| 2008/0027591 A1 | 1/2008 | Jones |
| 2009/0271108 A1* | 10/2009 | Kobori .................. G01C 21/30 701/532 |
| 2010/0246901 A1 | 9/2010 | Yang |
| 2012/0050489 A1 | 3/2012 | Gupta et al. |
| 2013/0131984 A1 | 5/2013 | Elgersma et al. |
| 2014/0005932 A1 | 1/2014 | Kozak et al. |
| 2014/0005933 A1 | 1/2014 | Fong et al. |
| 2016/0260238 A1* | 9/2016 | Lang ....................... G06T 11/60 |
| 2016/0318490 A1* | 11/2016 | Ben Shalom ...... B60K 31/0008 |

FOREIGN PATENT DOCUMENTS

| | | |
|---|---|---|
| DE | 102010033729 A1 | 2/2012 |
| DE | 102011081740 A1 | 3/2012 |
| DE | 102011082379 A1 | 3/2013 |
| EP | 2631729 A1 | 8/2013 |
| WO | 2010127650 A1 | 11/2010 |

OTHER PUBLICATIONS

German Search Report dated Dec. 19, 2014 for corresponding German Patent Application No. 10 2014 210 770.

International Search Report and Written Opinion dated Apr. 11, 2019 from corresponding International Patent Application No. PCT/DE2015/200300.

* cited by examiner

METHOD AND SYSTEM FOR DETERMINING THE POSITION OF A VEHICLE

CROSS REFERENCE TO RELATED APPLICATIONS

This U.S. patent application claims the benefit of PCT patent application No. PCT/DE2015/200300, filed May 6, 2015, which claims the benefit of German patent application No. 10 2014 210 770.9, filed Jun. 5, 2014, both of which are hereby incorporated by reference.

TECHNICAL FIELD

The invention relates to a method and a system for accurately determining the position of a vehicle, in particular of a road vehicle.

BACKGROUND

Road vehicles are increasingly being equipped with driver assistance systems. A driver assistance system supports the driver by means of various assistance functions during driving of the vehicle. 'Highly automated driving' is the term used to describe an intermediate step between assisted driving, during which the driver is supported by a function of the driver assistance system, and completely autonomous driving, during which the vehicle drives independently without any intervention on the part of the driver. In the case of highly automated driving the vehicle has a system which plans ahead and which can take over driving responsibilities at least in most driving situations. In this case the driver and the system work together, wherein the driver determines the extent to which the system intervenes in the driving behavior.

For highly automated driving it is, in many cases, necessary to determine the position of the vehicle very accurately. Conventional vehicles receive position data via a GPS unit in many cases. In addition, this position data can be processed with the aid of an available mobile phone network. However, this conventional approach only makes it possible to determine the position of a vehicle with an accuracy or resolution of approximately 5 to 50 m. This level of accuracy of the position determination is, however, not sufficient for a highly automated driving function of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

It is therefore an object of the present invention to provide a method and a system for determining the position of a vehicle, in which the position of the vehicle is determined so accurately that a highly automated driving function can be performed.

According to a first aspect of the invention, a method for determining the position of a vehicle is provided, said method comprising the steps: recording sensor data from the ground over which the vehicle travels, extracting ground characteristics of the ground over which the vehicle travels from the recorded sensor data or from occupancy grids which are calculated on the basis of the sensor data, and determining the current position of the vehicle on the basis of the extracted ground characteristics using a characteristic map.

In one possible embodiment of the method, the sensor data is produced by at least one sensor unit of the vehicle while it travels over the ground.

In one possible embodiment of the method, the sensor data includes camera images which are captured by at least one vehicle camera while the vehicle travels over the ground.

In another possible embodiment of the method, at least one occupancy grid of the ground over which the vehicle travels is calculated in real time from the sensor data recorded by the sensor units.

In another possible embodiment of the method, the recorded sensor data is transmitted via a wireless interface to a back-end server which extracts the ground characteristics from the sensor data received via the interface and determines the current position of the vehicle on the basis of the extracted ground characteristics using the characteristic map.

In another possible embodiment of the method, the ground characteristics of the ground over which the vehicle travels extracted by a data processing unit of the vehicle are transmitted via a wireless interface to a back-end server which determines the current position of the vehicle on the basis of the ground characteristics received via the interface using the characteristic map.

In another possible embodiment of the method, the back-end server reports back the current position of the vehicle determined by it via the interface to the vehicle.

In another possible embodiment of the method, the ground characteristics of the ground over which the vehicle travels extracted by a data processing unit of the vehicle are compared with the ground characteristics, which are drawn by a back-end server from the characteristic map and transmitted via a wireless interface to the data processing unit of the vehicle, in order to determine the current position of the vehicle.

In another possible embodiment of the method, the current position of the vehicle is determined on the basis of the extracted ground characteristics using the characteristic map in a limited search area.

In another possible embodiment of the method, the search area in the characteristic map is limited by a rough determination of the position of the vehicle on the basis of GPS signals, mobile phone signals and/or odometry.

In another possible embodiment of the method, the back-end server has access to the global characteristic map stored in a database.

In another possible embodiment of the method, the characteristic map is generated and/or updated on the basis of sensor data which is received from vehicles by the back-end server, or on the basis of satellite images.

In another possible embodiment of the method, the ground characteristics of the ground over which the vehicle travels extracted from the sensor data and/or occupancy grids include ground markings, in particular lane markers, and ground traffic signs, ground joints, in particular tar joints, lane grooves, textures of the ground over which the vehicle travels and/or manhole covers or the like.

In another possible embodiment of the method, the ground characteristics of the ground over which the vehicle travels extracted from the sensor data and/or occupancy grids include general edge information, in particular information about edges of reflector posts, guard rails, houses and/or tunnels and/or bridges.

In another possible embodiment of the method, the position of the vehicle is determined accurately with a positional accuracy which can be up to less than 10 cm.

The invention therefore provides, according to a second aspect, a system for determining the position of a vehicle having: at least one sensor unit which supplies sensor data from the ground traveled over by the vehicle, an extracting unit which extracts ground characteristics from the recorded sensor data and/or from occupancy grids which are calculated on the basis of sensor data, and having a calculation unit which determines a current position of the vehicle on the basis of the extracted ground characteristics using a stored characteristic map.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Possible embodiments of the method according to the invention and of the system according to the invention for determining the position of a vehicle will be explained in more detail below, with reference to the attached figures, wherein.

DETAILED DESCRIPTION

Figure 1:
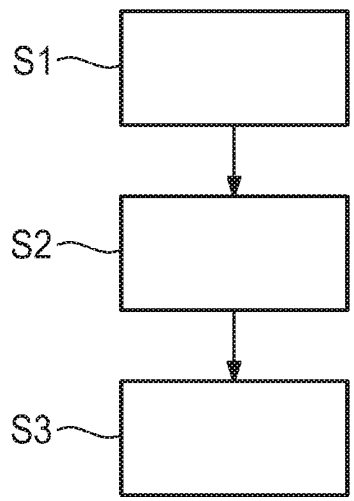
FIG. 1 shows a flowchart in order to illustrate one embodiment example of the method.

As can be seen in FIG. 1, the method according to the invention for determining the position of a vehicle in the shown embodiment example includes several steps. In a first step S1 sensor data from the ground over which the vehicle travels is recorded. The vehicle is preferably a road vehicle, in particular a car or truck. The vehicle moves over the ground, for example a tarred road or a gravel track. The sensor data is produced by at least one sensor unit of the vehicle while the vehicle travels over the ground.

In this case, the sensor data can include camera images which are captured by at least one vehicle camera while the vehicle travels over the ground. In one possible embodiment, the recorded sensor data is intermediately stored in an intermediate storage device for further data processing.

In an additional step S2, the ground characteristics of the ground over which the vehicle travels are extracted from the recorded sensor data or from occupancy grids which are calculated on the basis of the sensor data. In one possible embodiment, so-called occupancy grids of the ground over which the vehicle travels are calculated from the recorded sensor data and intermediately stored. In one possible embodiment, ground characteristics of the ground over which the vehicle travels are then extracted from these occupancy grids.

Alternatively, the ground characteristics of the ground over which the vehicle travels are extracted directly from the recorded sensor raw data. In another possible embodiment, the ground characteristics are extracted in step S2 both from recorded sensor data and from intermediately stored occupancy grids which have been calculated on the basis of the sensor data. The sensor data can be camera images. In addition, the sensor data can also be other types of sensor data, for example radar data or data which is generated by a lidar system.

In an additional step S3 of the embodiment example shown in FIG. 1, the current position of the vehicle is determined on the basis of the extracted ground characteristics using a characteristic map.

The recording of the sensor data in step S1 is effected by sensor units of the vehicle, in particular vehicle cameras which generate camera images. The extracting of ground characteristics of the ground over which the vehicle travels from the recorded sensor data or from intermediately stored occupancy grids, which are calculated on the basis of the sensor data, is effected by a calculation or data processing unit. In one possible embodiment, this is a data processing unit inside the vehicle.

In an alternative embodiment, the data processing unit for extracting the ground characteristics can be located in a server which is connected via a wireless interface to a transceiver of the vehicle. In this embodiment, the sensor data recorded in step S1 can be transmitted via the wireless interface to the back-end server which extracts the ground characteristics from the sensor data received via the interface and determines the current position of the vehicle on the basis of the extracted ground characteristics using the characteristic map. To this end, the back-end server or the data processing unit thereof has access to a storage device on which a characteristic map is located. The back-end server then reports back the current position of the vehicle determined by it via the wireless interface to the vehicle.

In an alternative embodiment, the ground characteristics are extracted by a data processing unit of the vehicle and the current position of the vehicle is determined by a data processing unit of a back-end server. In this embodiment, ground characteristics of the ground over which the vehicle travels are firstly extracted in step S2 by a data processing unit of the vehicle and the extracted ground characteristics are then transmitted via the wireless interface of the vehicle to a back-end server. A data processing unit of the back-end server then determines the current position of the vehicle on the basis of the ground characteristics received via the wireless interface using a stored characteristic map and reports this back via the wireless interface to the vehicle.

In another possible embodiment of the method according to the invention, the ground characteristics of the ground over which the vehicle travels extracted by a data processing unit of the vehicle are compared with the ground characteristics, which are drawn by the back-end server from the characteristic map and transmitted via a wireless interface to the data processing unit of the vehicle, in order to determine the current position of the vehicle.

The determination of the current position of the vehicle on the basis of the extracted ground characteristics in step S3 is effected using a characteristic map. In this case, the current position of the vehicle is preferably determined on the basis of the extracted ground characteristics using the characteristic map in a limited search area. As a result of this, the computing outlay and/or computing time can be significantly reduced. In addition to reducing the computing time, the limiting to a specific search area additionally results in less ambiguities.

In a preferred embodiment, the search area in the characteristic map is limited by a rough determination of the position of the vehicle on the basis of GPS signals, mobile phone signals or by odometry. One problem during the determination of the position of the vehicle using landmarks or ground characteristics occurs in the form of ambiguities, i.e. there are various locations in the road network, which can have a similar configuration of landmarks or ground characteristics. Due to the rough determination of the position of the vehicle on the basis of GPS signals or a continuous position determination using odometry, the search area in the characteristic map can be limited, resulting in less ambiguities.

The characteristic map is preferably generated and preferably constantly updated on the basis of sensor data which is received from vehicles by the back-end server or on the basis of satellite images. Possible marks or ground characteristics include ground markings, in particular lane markers, as well as ground traffic signs, ground joints, in particular tar joints, lane grooves, textures of the ground over which the vehicle travels or changes in color of the ground as well as structural units such as, for example, manhole covers or the like.

Additional possible marks or ground characteristics also include general edge information. General edge information can thereby be, for example, edge information extracted from a camera image using suitable image processing operators. This edge information can, for example, comprise information about edges of reflector posts, guard rails, houses, tunnels, bridges or the like. Consequently, the term 'ground characteristics' not only denotes features which are acquired directly from the ground beneath or in front of the vehicle. Rather, the term 'ground characteristics' denotes all of the features which are fixed with respect to the ground. In principle, all types of stationary edges of any orientation as well as corners formed from edges are suitable. The edge information can, additionally or alternatively, also comprise information regarding any other edges, e.g. the outline edges of mountains or the like. Known operators such as Sobel or Canny are suitable as possible image processing operators for extracting the edges from a camera image.

The position of the vehicle can be accurately determined with a positional accuracy which can be up to less than 10 cm with the method according to the invention, as shown in the embodiment example according to FIG. 1.

Figure 2:
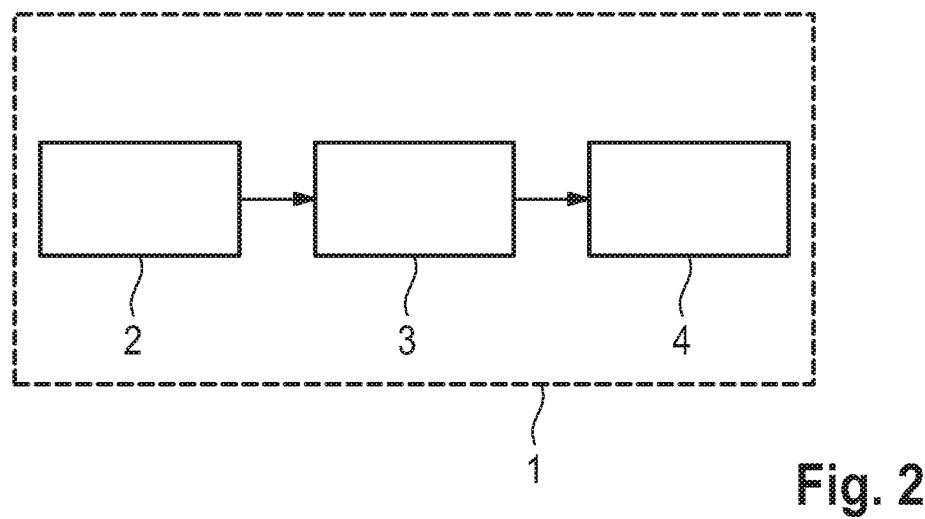
FIG. 2 shows a block wiring diagram in order to illustrate one embodiment example of the system for determining the position of a vehicle.

FIG. 2 shows a block diagram in order to illustrate an embodiment example of a system 1 according to the invention for determining the position of a vehicle. In the embodiment example shown in FIG. 2, the system 1 contains at least one sensor unit 2 which supplies sensor data from the ground traveled over by the vehicle. The ground over which the vehicle travels is, for example, a public highway or other track open to traffic. The system 1 additionally has an extracting unit 3 which extracts ground characteristics from the recorded sensor data directly or indirectly from intermediately stored occupancy grids which have been calculated on the basis of the received sensor data.

A calculation unit 4 determines the current position of a vehicle on the basis of the extracted ground characteristics using a stored characteristic map. In this case, the calculation unit supplies the position of the vehicle accurately with a positional accuracy which can be up to less than 10 cm. This accurate position of the vehicle can, in one possible embodiment, be used by a driver assistance system of the vehicle, which provides one or more highly automated driving functions HAF.

Figure 3:
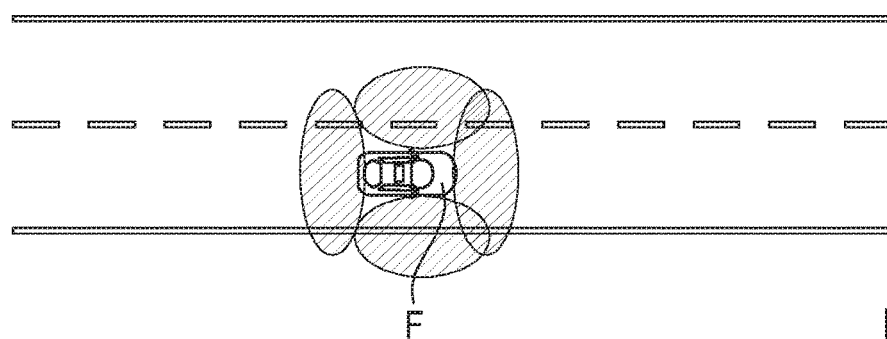
FIG. 3 shows diagrammatic sketches in order to illustrate a first possible embodiment example of the method and the system according to the invention for determining the position of a vehicle.
Figure 4:
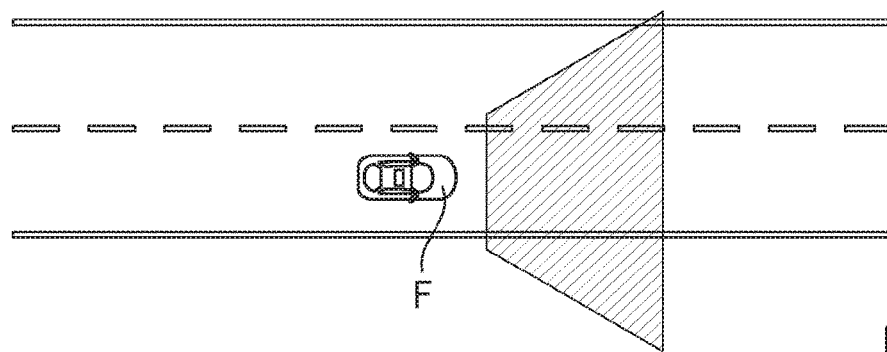
FIG. 4 shows diagrammatic sketches in order to illustrate a second possible embodiment example of the method and the system according to the invention for determining the position of a vehicle.

FIGS. 3, 4 and 5 serve to explain the operating method of the system according to the invention and of the method according to the invention in order to accurately determine the position of a vehicle.

FIG. 3 shows a vehicle F which is moving on a two-lane road. The vehicle F has, for example, the system 1 shown in FIG. 2 for determining the position of its vehicle. In the embodiment example shown in FIG. 3, the vehicle F additionally has a surround view system which supplies images of the area surrounding the vehicle. This surround view system has multiple vehicle cameras which can be mounted at various locations on the bodywork of the vehicle. In the example shown in FIG. 3, the vehicle F has four different vehicle cameras which supply camera images illustrating segments of the ground over which the vehicle is traveling located in the vicinity of the vehicle F. In the example shown in FIG. 3, lane markers between the two lanes of the road can, for example, serve as ground characteristics, which can be extracted by the system 1 according to the invention as ground characteristics of the ground over which the vehicle travels. In addition, shoulders of the roadway can be used as ground markings.

FIG. 3 shows a recording area on the road using a top view system.

FIG. 4 shows the recording area for recording ground characteristics on a road with the aid of a front or anterior camera of the vehicle F.

Figure 5A:
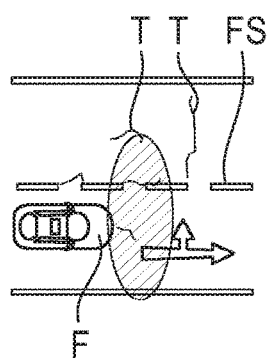
FIG. 5A shows a first diagrammatic sketch having an example ground characteristic on the road which illustrates a third possible embodiment example of the method and the system according to the invention for determining the position of a vehicle.
Figure 5B:
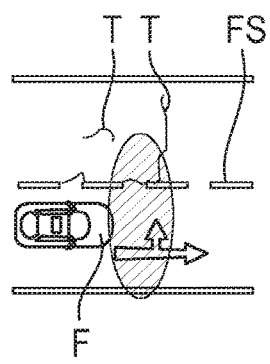
FIG. 5B shows a second diagrammatic sketch having another example ground characteristic on the road which illustrates the third possible embodiment example of the method and the system according to the invention for determining the position of a vehicle.
Figure 5C:
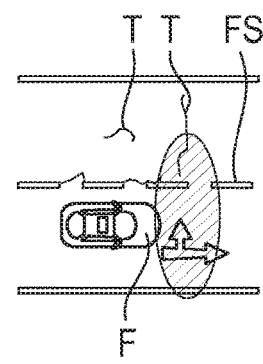
FIG. 5C shows a third diagrammatic sketch having a third example ground characteristic on the road which illustrates the third possible embodiment example of the method and the system according to the invention for determining the position of a vehicle.

FIGS. 5a, 5b and 5c show, by way of example, possible ground characteristics on the road, which can be used by the method and system according to the invention in order to determine the position of the vehicle F. It can be seen in FIGS. 5a, 5b and 5c that a vehicle F is moving towards the right on the road, wherein a recording area gradually sweeps over a segment of the ground over which the vehicle travels.

In the example shown in FIG. 5, the ground characteristics of the ground over which the vehicle travels, which can be extracted include, for example, tar joints T as well as lane markers FS between the two lanes of the road. In addition, a shoulder of the road or road signs can serve as ground characteristics, for example the traffic arrow shown in FIG. 5. In addition, a plurality of other ground characteristics can be extracted by the method according to the invention, for example lane grooves, textures of the ground over which the vehicle travels or manhole covers and the like.

The determination of the position or the calculation of the position of the vehicle can either be effected by a data processing unit inside the vehicle or by a data processing unit of a back-end server. The data processing units can contain one or more microprocessors and run appropriate calculation programs. The characteristic map required to determine the position of the vehicle can be compiled with the aid of satellite images in one possible embodiment. In addition, the characteristic map can also be generated by traveling along the road or route.

In addition to sensor data or camera images, grid-based environmental models, in particular so-called occupancy grids, can also be used for determining the position of the vehicle, if, for example, an appropriate illustration of the surroundings or the environment exists in the back-end server. In one possible embodiment, an occupancy grid calculated by a data processing unit of the vehicle is regularly transmitted via a wireless interface to a back-end server, in order to update the existing maps there. In order to include the new information on the back-end server, it is essential to precisely match the vehicle map with the global map. An accurate position determination, which can be transmitted back to the vehicle, is required for this.

One advantage of using occupancy grids is that they can be provided not only by a camera, but also by other sensor units, in particular radar sensor units, lidar sensor units, PMD sensor units or ultrasonic sensor units and therefore make it possible to improve the determination of the position of the vehicle independently of sensors. One advantage of calculating the improved positioning in the back-end server arises from the fact that it is not necessary to provide a global occupancy grid with a suitably large storage requirement inside the vehicle. Furthermore, complex calculations for matching the vehicle grid with the global occupancy grid with the aid of a high-performance server can be performed. As in the case of an image, in particular a camera image, it is also possible in the case of an occupancy grid to extract features, for example corners of lane markers, and to use these for a position determination.

If the data is processed in the back-end server, two different transmission models can be used, namely either the transmission of the raw data or the transmission of calculated or extracted features, for example "good features to track". The back-end server can subsequently evaluate the received data, in order to establish where exactly the vehicle is located, because a relatively clear image is produced from the data or received camera images, making it possible to accurately determine the position of the vehicle. In order to avoid ambiguities, inertial sensor technology and a GPS signal can, in addition, be included in the evaluation of the data. As a result, the search area is greatly reduced.

As an alternative to the data being processed in the back-end server, the data can also be processed by a data processing unit or calculation unit inside the vehicle. In this embodiment, the sensor data is compared with data originating from the back-end server, in order to guarantee an accurate position determination.

In one possible embodiment, the road or route is precisely surveyed beforehand so that a suitable characteristic map is provided. In the case of one possible embodiment, a back-end server has access to the characteristic map thus generated. During the exact surveying of the route the position of the ground characteristics and/or of the sensor raw data is preferably detected during travel with a high-precision GPS signal and are correlated.

The system according to the invention for determining the position of a vehicle can, in one possible embodiment, also be used as a redundant system for checking a conventional position determination, in order to verify the actual positioning of the vehicle and to establish whether an error has occurred in the primary system during the measurement of the position. In this embodiment, if deviations occur and exceed a certain measure, the system can be switched off and the driver takes over. In this embodiment, not only is the system able to determine the exact position, but it can additionally control the primary system.

Figure 6:
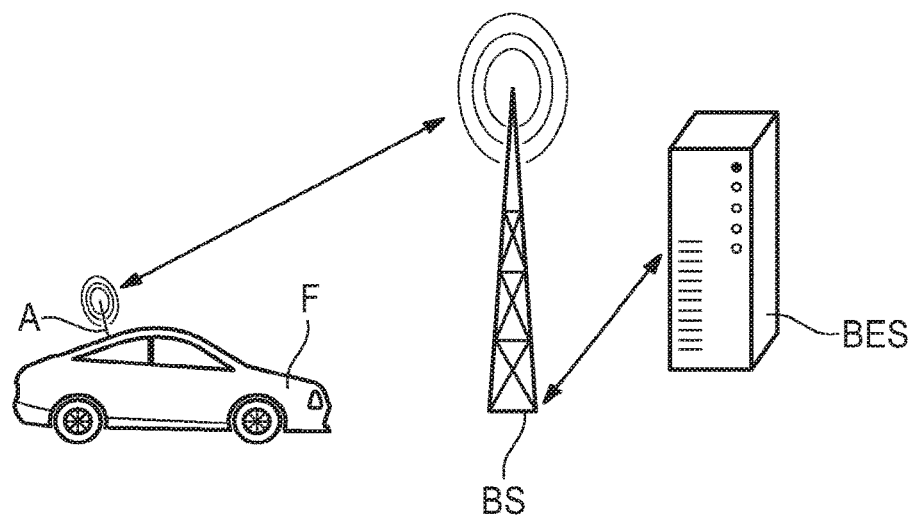
FIG. 6 shows a diagram in order to illustrate another embodiment example of the system according to the invention for determining the position of a vehicle.

FIG. 6 serves to illustrate one embodiment example of the system according to the invention. As shown in FIG. 6, the vehicle F has an antenna A which communicates via a wireless interface with the antenna of a base station BS which is connected via a network to a back-end server BES.

The system for determining the position of the vehicle shown in FIG. 2 can be distributed among various units. Thus, in one possible embodiment, the sensor unit 2 and the extracting unit 3 are located inside the vehicle F and only the extracted features are supplied to the backend server BES via the wireless interface via the base station BS. The back-end server BES has, in this embodiment, a calculation unit 4 which determines the current position of a vehicle on the basis of the received, extracted ground characteristics using a stored characteristic map. The back-end server BES then transmits the exact position of the vehicle thus ascertained via the wireless interface back to the vehicle F.

In another possible embodiment, the sensor raw data supplied by the sensor unit is supplied directly via the wireless interface of the base station BS to the back-end server BES. In this embodiment, the back-end server BES has an extracting unit which extracts the ground characteristics from the transmitted sensor data. These extracted ground characteristics are then fed to a calculation unit of the back-end server BES which determines the current position of the vehicle on the basis of the extracted ground characteristics using a stored characteristic map.

In another possible embodiment of the system 1 according to the invention, both the sensor unit 2 and the extracting unit 3 as well as the calculation unit 4 are located inside the vehicle F, so that the system functions autonomously without a wireless interface of a base station. In this embodiment, the system 1 inside the vehicle F has powerful calculation units which can perform an extraction and a position determination in real time. In addition, in the case of this embodiment, the system 1 has a relatively large data storage device for storing a comprehensive characteristic map.

Conversely, the advantage of relocating the extracting unit 3 and the calculation unit 4 inside the back-end server BES is that the vehicle F itself requires a less powerful data processing unit and also has to have less storage capacity.

Figure 7:
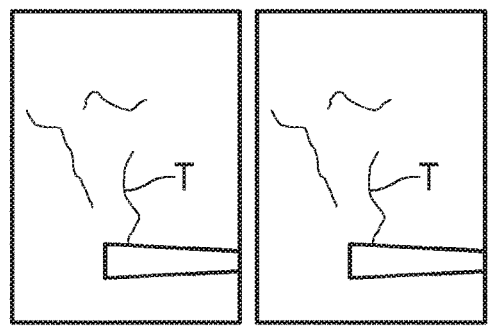
FIG. 7 shows an exemplary example in order to illustrate the ground condition at raw data level.

FIG. 7 shows, by way of example, the ground condition of the ground over which the vehicle travels at raw data level. FIG. 7 shows two time exposures of the ground over which a vehicle F travels. Various tar joints T and part of a traffic direction arrow, which has two corners at its rear end, can be seen in the example.

Figure 8:
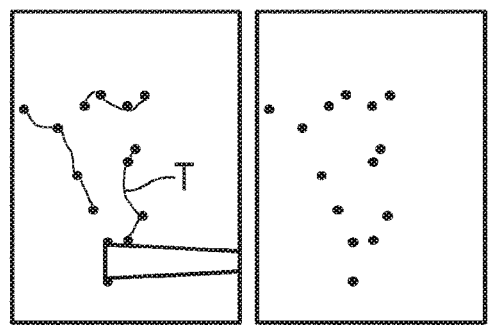
FIG. 8 shows how the ground characteristics of the ground over which the vehicle travels extracted in FIG. 7 can be used in the method and system according to the invention.

FIG. 8 shows the ground characteristics extracted from the ground over which the vehicle travels. For example, points which form a specific pattern, as shown in FIG. 8, are generated with respect to the tar joints T and the two corners of the traffic direction arrow. The extracted ground characteristics shown in FIG. 8 can be compared with a stored characteristic map, in order to calculate an exact driving position of the vehicle with an accuracy of less than 10 cm.

With the aid of this exact position of the vehicle, a driver assistance system of the vehicle can make available highly automated driving functions. During highly automated driving, the driver of the vehicle F can temporarily hand over responsibility to the driver assistance system and devote himself for a while to other tasks. In the event of a problematic traffic situation occurring, the driver can take over complete control of the vehicle again within a so-called takeover time.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

What is claimed is:

1. A method for determining the position of a vehicle, comprising:
   recording sensor data from the ground over which the vehicle travels;
   extracting ground characteristics of the ground over which the vehicle travels from one of the recorded sensor data and from occupancy grids, wherein the occupancy grids are calculated on the basis of the sensor data; and
   determining the current position of the vehicle on the basis of the extracted ground characteristics using a characteristic map.

2. The method according to claim 1, wherein the sensor data is produced by at least one sensor unit of the vehicle while the vehicle travels over the ground.

3. The method according to claim 1, wherein the sensor data includes camera images which are captured by at least one vehicle camera while the vehicle travels over the ground.

4. The method according to claim 1, wherein at least one occupancy grid of the ground over which the vehicle travels is calculated in real time from the sensor data recorded by the sensor units.

5. The method according to claim 1, wherein the recorded sensor data is transmitted via a wireless interface to a back-end server which extracts the ground characteristics from the sensor data received via the interface and determines the current position of the vehicle on the basis of the extracted ground characteristics using the characteristic map.

6. The method according to claim 5, wherein the back-end server reports back the current position of the vehicle determined by the server via the interface to the vehicle.

7. The method according to claim 5, wherein the back-end server has access to the global characteristic map stored in a database.

8. The method according to claim 5, wherein the characteristic map is one of generated and updated on the basis of sensor data, which is received from vehicles by one of the back-end server and on the basis of satellite images.

9. The method according to claim 1, wherein the ground characteristics of the ground over which the vehicle travels extracted by a data processing unit of the vehicle are transmitted via a wireless interface to a back-end server, which determines the current position of the vehicle on the basis of the ground characteristics received via the interface using the characteristic map.

10. The method according to claim 9, wherein the back-end server reports back the current position of the vehicle determined by the server via the interface to the vehicle.

11. The method according to claim 1, wherein the ground characteristics of the ground over which the vehicle travels extracted by a data processing unit of the vehicle are compared with the ground characteristics, which are drawn by a back-end server from the characteristic map and transmitted via a wireless interface to the data processing unit of the vehicle, in order to determine the current position of the vehicle.

12. The method according to claim 1, wherein the current position of the vehicle is determined on the basis of the extracted ground characteristics using the characteristic map in a limited search area, wherein the search area is limited in particular in the characteristic map by a rough determination of the position of the vehicle on the basis of at least one of GPS signals, mobile phone signals and by odometry.

13. The method according to claim 1, wherein the ground characteristics of the ground over which the vehicle travels extracted from one of the sensor data and occupancy grids, further comprises at least one of: ground markings, lane markers, ground traffic signs, ground joints, tar joints, lane grooves, textures of the ground over which the vehicle travels, and manhole covers.

14. The method according to claim 1, wherein the ground characteristics of the ground over which the vehicle travels extracted from at least one of the sensor data and occupancy grids comprise general edge information.

15. The method according to claim 14, wherein the ground characteristics comprise information about at least one of edges of reflector posts, guard rails, houses, tunnels and bridges.

16. The method according to claim 1, wherein the position of the vehicle is accurately determined with a positional accuracy of up to less than 10 cm.

17. A system for determining the position of a vehicle comprising:
   at least one sensor unit which supplies sensor data from the ground over which the vehicle travels;
   an extracting unit which extracts ground characteristics from the recorded sensor data and/or from occupancy grids which are calculated on the basis of sensor data; and
   a calculation unit which determines the current position of a vehicle on the basis of the extracted ground characteristics using a stored characteristic map.

18. The method according to claim 3, wherein general edge information is obtained from the camera images.

19. The method according to claim 13, wherein the sensor data includes camera images which are captured by at least one vehicle camera while the vehicle travels over the ground.

20. The method according to claim 14, wherein the general edge information is obtained from one of radar data and the camera or lidar images.

* * * * *